United States Patent [19]

Fauvel

[11] Patent Number: 4,758,481

[45] Date of Patent: Jul. 19, 1988

[54] FUEL CELL WITH IMPROVED SEPARATION

[75] Inventor: Pierre Fauvel, Boullay les Troux, France

[73] Assignee: Occidental Chemical Corporation, Niagara Falls, N.Y.

[21] Appl. No.: 929,858

[22] PCT Filed: Mar. 13, 1986

[86] PCT No.: PCT/FR86/00085

§ 371 Date: Oct. 30, 1986

§ 102(e) Date: Oct. 30, 1986

[87] PCT Pub. No.: WO86/05629

PCT Pub. Date: Sep. 25, 1986

[30] Foreign Application Priority Data

Mar. 15, 1985 [FR] France ............................... 85 03855

[51] Int. Cl.⁴ ............................................... H01M 2/14

[52] U.S. Cl. ........................................ 429/39; 429/34; 429/38

[58] Field of Search .................................... 429/34–39, 429/142–144

[56] References Cited

U.S. PATENT DOCUMENTS

| | | | |
|---|---|---|---|
| 3,690,954 | 9/1972 | Warszawski | 429/39 |
| 3,944,435 | 3/1976 | Kordesch | 136/111 |
| 4,064,321 | 12/1977 | Grehier | 429/34 |
| 4,074,020 | 2/1978 | Regnaut | 429/34 |

FOREIGN PATENT DOCUMENTS

| | | |
|---|---|---|
| 0061942 | 10/1982 | European Pat. Off. . |
| 2733047 | 2/1979 | Fed. Rep. of Germany . |
| 2117863 | 7/1972 | France . |
| 2140664 | 1/1973 | France . |
| 2146602 | 3/1973 | France . |
| 2178076 | 11/1973 | France . |
| 2302598 | 9/1976 | France . |
| 2300426 | 9/1976 | France . |
| 2440084 | 5/1980 | France . |

OTHER PUBLICATIONS

Abstract No. 288, "Engineering Analysis of an NH--3—Air Fuel Cell System for Vehicles", by P. N. Ross, Jr., *Extended Abstracts*, vol. 82-2, Oct. 17-21, 1982, pp. 467–468.

*Primary Examiner*—Brian E. Hearn
*Assistant Examiner*—Stephen J. Kalafut
*Attorney, Agent, or Firm*—Kenyon & Kenyon

[57] ABSTRACT

The fuel cell is constituted by a plurality of elements disposed in electrical contact with one another, with each element comprising two porous electrodes, an electrolyte filling the gap situated between said electrodes, and two impermeable bipolar current collectors. One of the electrodes is fixed to a frame having a central orifice. One face of said frame includes grooves for conveying electrolyte from an inlet orifice to a manifold chamber which communicates with the electrolyte compartment, and further grooves for removing electrolyte therefrom to an outlet orifice. The electrolyte compartment is closed by another insulating frame to which the second electrode is fixed.

In a preferred embodiment of the invention a separator is provided in the electrolyte compartment in the form of a grating constituted by insulating bars which are parallel to one another and to the direction of electrolyte flow, and constituting an integral part of one of the frames of the electrolyte compartment.

6 Claims, 9 Drawing Sheets

FUEL CELL WITH IMPROVED SEPARATION

BACKGROUND OF THE INVENTION

The present invention relates to a fuel cell with improved separation. It relates in particular to a fuel cell which is essentially constituted by a plurality of identical juxtaposed elements which are disposed in electrical contact with one another.

Overall, such a cell structure includes three distribution circuits which are common to all of the cells:

an electrolyte distribution circuit for distributing electrolyte from an external source and including, in particular, a common inlet channel and a common outlet channel;

a fuel distribution circuit for distributing fuel from an external source and including, in particular, at least one fuel inlet channel and at least one outlet channel for removing unburnt fuel and inert gases from the cell structure; and an oxidant distribution circuit including, in particular, a plurality of oxidant inlet and outlet orifices situated in the bottom and top faces of the cell structure.

In addition, each cell comprises, in outline:

first and second porous electrodes which are preferably plane in shape with parallel faces, one being a cathode and the other an anode, and each including a specific catalyst;

an electrolyte filling the gap situated between the said electrodes; and first and second impermeable bipolar current collectors comprising respective first and second frames of plastic material having at least one central conductive zone having channels on each of its faces, the first collector coming into electrical contact via the high points of its cathode face with the external surface of the said cathode, and via its anode face with the external surface of the anode of an adjacent cell, and the second collector coming into electrical contact via the high points of its anode face with the external surface of the said anode, and via its cathode face with the cathode of the other adjacent cell; the oxidizing gas from the said common oxidant distribution circuit flowing between the said cathode and the cathode face of the first collector and being supplied to the said cathode, and the fuel gas from the said common fuel distribution circuit flowing between the said anode and the anode face of the second collector and being supplied to the said anode; the first and second frames being provided with orifices to allow the electrolyte and the fuel to flow through the cell structure, the said orifices contributing by their juxtaposition to defining the said common inlet and outlet channels. Means are provided on the anode face of the second collector to enable the fuel from the inlet channels to be conveyed over the surface of the anode and away from said surface to the outlet channels; said means including grooves constituting a plurality of microchannels, which grooves are disposed in the top and bottom portions of the said second frame.

Further, the first electrode is applied against a third frame made of plastic material and having a central orifice in the form of a quadrilateral, the top and bottom portions of the third frame including orifices for conveying fuel and electrolyte through the cell structure, said orifices corresponding to the orifices for conveying fuel and electrolyte through the cell structure, said orifices corresponding to the orifices provided in the frames of the collectors, and likewise contributing to the formation of the said inlet and outlet channels for the fuel and the electrolyte; means being provided on one face of the third frame to enable electrolyte to be conveyed from the inlet channel to an electrolyte compartment situated between the two electrodes, and from the said compartment to an outlet channel; the said means including grooves that open out into set back portions that constitute electrolyte distributing and collecting manifolds disposed on the top and bottom portions of the third frame along two opposite sides of the central orifice and in communication with the electrolyte chamber by means of a plurality of parallel microchannels delimited by ribs.

The second electrode is applied against one of the faces of a fourth frame facing the said current collector; the fourth frame is made of an insulating plastic material, is of identical contour to the third frme against which the first electrode is applied, and has fuel and electrolyte conveying orifices corresponding to those provided in the said third frame. The fourth frame is applied by a plane face against the face of the said third frame having the grooves and the electrolyte distributing and collecting manifolds.

When a repetitive stack is made using a predetermined elementary sequence of frames as defined above having a series of superposed orifices, a cell structure is obtained having a plurality of cells connected electrically in series together with a common channel for conveying electrolyte into each of the electrolyte compartments, a common cahnnel for removing the electrolyte, a plurality of common channels for supplying all the anodes with fuel, and a plurality of common channels for evacuating gases.

The oxidant flows through the stacked cell structure by passing directly through the cathode compartments in a vertical direction via orifices and distribution means provided at the bottom and top edges of the corresponding frames.

All these plastic material frames are thin, they may be between 0.2 mm and 5 mm thick; and advantageously they are molded.

The frame material may be selected from synthetic insulating materials of the following types: polypropylene, polyethylene, polyvinyl chloride (PVC), acrylonitrilebutadiene-styrene (ABS), polysulfone, polystyrene.

It is known that each electrolyte compartment may contain a microporous separator constituted, for example, by a corrugated sheet. This electrolyte-impregnated separator presents a degree of resistance to the passage of ions, thereby leading to a small, but non-negligible, ohmic drop.

A separator may have one or more of the following functions.

It should be capable of maintaining a certain distance between the electrodes and thus avoiding any possibility of a short circuit, regardless of the cause bringing the electrodes together, e.g. the collector-electrode assemblies being warped, local electrode unsticking, etc . . .

It must preferably be capable of maintaining a constant gap between the electrodes over the entire surface of an element so as to ensure uniformn electrolyte flow.

It must constitute a wall or a hydrophilic network which facilittes complete filling of the electrolyte compartment with electrolyte solution by the wick effect, which filling is made difficult by the hydrophobic or semi-hydrophobic nature of the two walls which constitute the surfaces of the two electrodes.

It must make it possible, by virtue of its hydrophilic surface, to establish a continuous or quasi-continuous layer of liquid which is capable of remaining intact even if the electrolyte compartment is accidentally emptied, e.g. by an electrode being perforated. This layer of liquid thus constitutes a screen preventing direct mixing of the two gases and the possible consequences of such mixing such as ignition and combustion inside the cell, explosiuon, etc . . .

SUMMARY OF THE INVENTION

The object of the present invention is to provide a separator in the electrolyte compartment which is better suited to the highly specific structure of electrolyte compartments in a fuel cell in accordance with the invention.

The present invention provides a fuel cell as defined above, in which the electrolyte compartment contains a separator, constituted by a grating of insulating material forming a single part with said third frame or said fourth frame, and comprising bars whose thickness is no greater than the inter-electrode gap.

Said bars are preferably parallel to one another and to the direction of electrolyte flow. They may be fixed to one another by cross threads of the same material.

In a particular embodiment, spacing tabs may be provided at the cross-points between the bars and said cross threads. These tabs may be disk-shaped and have a diameter which is greater than the pitch of said electrodes.

The material from which said bars are made is preferably chosen from: polypropylene, polyvinyl chloride (PVC), nylon, polyethylene, and impregnated polymers.

BRIEF DESCRIPTION OF THE DRAWINGS

Other characteristics and advantages of the present invention appear from the following description of embodiments given by way of non-limiting example. In the accompanying drawings.

DETAILED DESCRIPTION OF THE PREFERRED EMBODIMENTS

Figure 1:
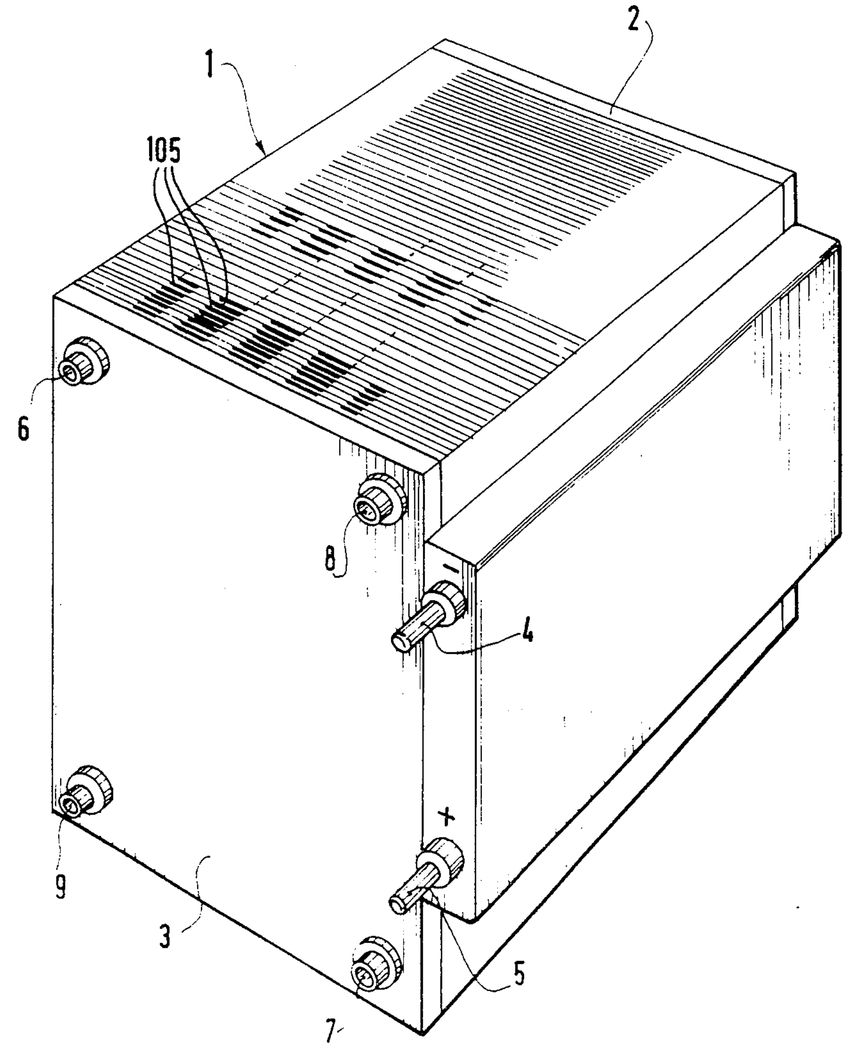
FIG. 1 is a diagrammatic perspective view of a fuel cell structure in accordance with the invention.

FIG. 1 shows a cell structure 1 comprising a stack of cells in accordance with the invention. The cell structure is provided with end plates 2 and 3 and with terminal posts 4 and 5 connected to respective end current collectors of the stack.

Orifices 6 and 7 are respectively an electrolyte inlet orifice and an electrolyte outlet orifice. Orifices 8 and 9 are respectively a gas fuel (hydrogen in this case) inlet orifice and outlet orifice.

The oxidant (air) enters the cell structure via the top ends of passages 105 as shown in the figure. Similar orifices are disposed on the bottom of the cell structure.

Figure 2:
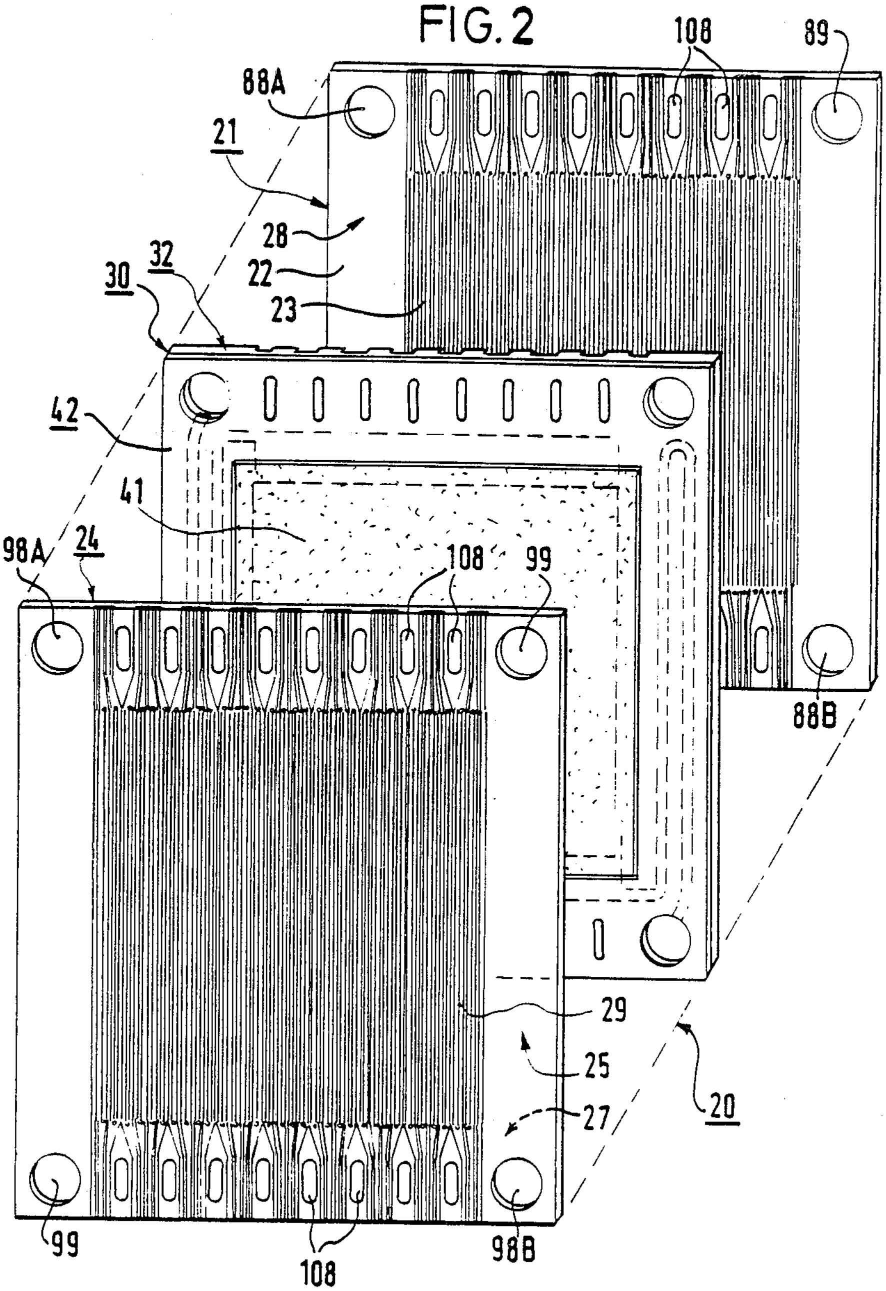
FIG. 2 is a diagrammatic exploded perspective view of a cell of the FIG. 1 fuel cell structure.

The cell structure 1 is constituted by juxtaposing cells 20 such as the cell shown diagrammatically in FIG. 2. The middle compartment 30 of the cell shown in FIG. 2 is shown in greater detail in FIG. 3.

Figure 3:
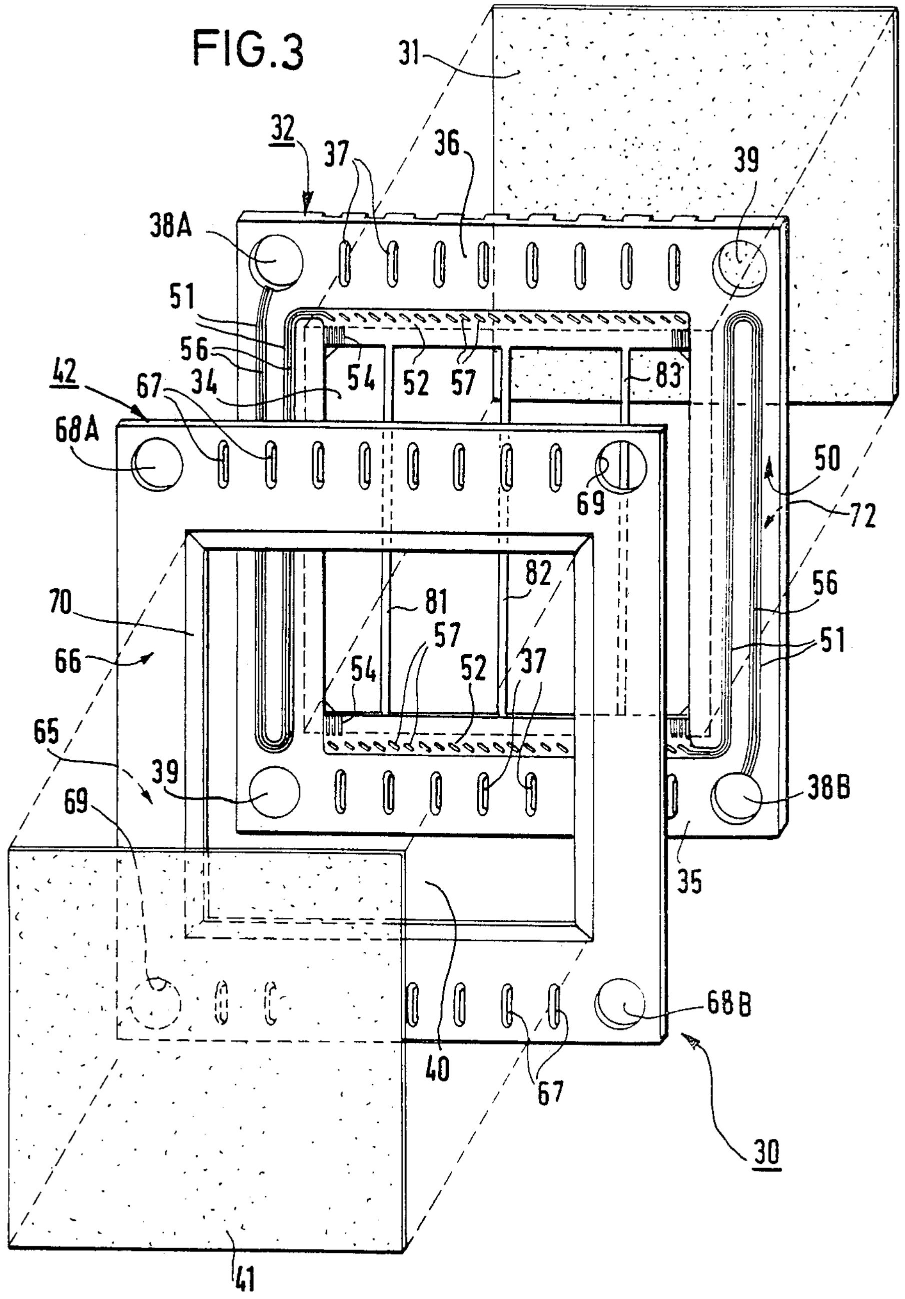
FIG. 3 is a diagrammatic exploded perspective view of the electrolyte compartment of the FIG. 2 cell.

The cell shown in FIGS. 2 and 3 includes a cathode 31 or first electrode associated with the cathode face 28 of a first bipolar current collector 21. The collector (see FIG. 4) comprises a frame 22 referred to as the "first" frame made of plastic material and a central conductive zone 23 having channels and in electrical contact against the outside face of the cathode 31. The bipolar collector 21 has a central anode conductive zone on its face which is not visible in FIG. 2 but which is identical to the face shown in FIG. 5, this anode zone is in electrical contact with the external anode face of an adjacent cell. The face of the cathode 31 facing the collector 21 is in contact with the gaseous oxidant, and the opposite face of the cathode 31 is in contact with the electrolyte.

Figures 4, 5, 6:
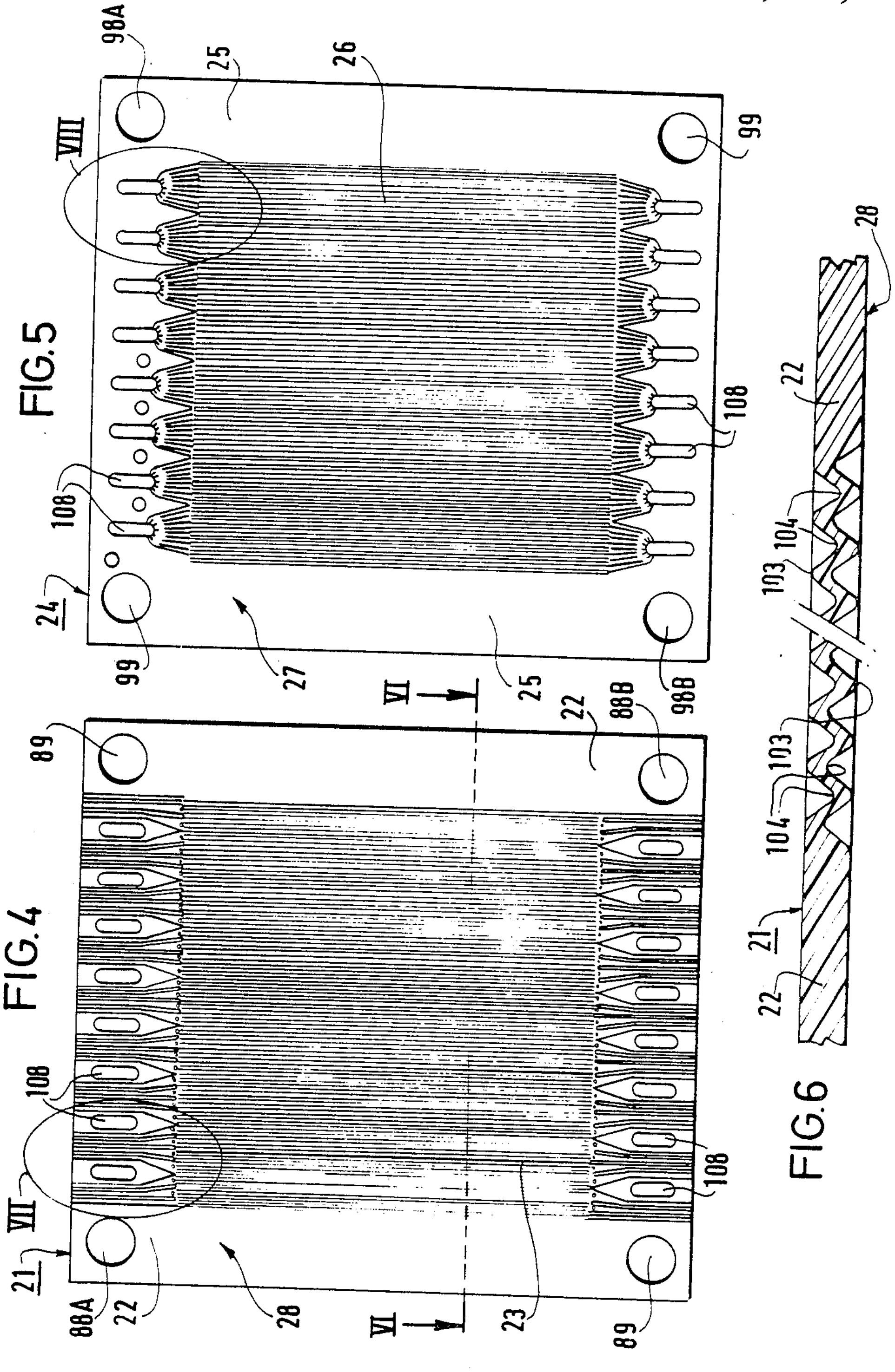
FIG. 4 is an elevation view of one face of a bipolar current collector from the FIG. 2 cell.
FIG. 5 is an elevation view of the anode face of a bipolar current collector from the FIG. 2 cell.
FIG. 6 is a diagrammatic section on a larger scale on a line VI—VI in FIG. 4.

Likewise, an anode 41 or a second electrode is associated with the anode face 27 of a second bipolar current collector 24. Like the current collector 21, it comprises a "second" frame 25 made of plastic material and a central conductive anode zone 26 which is not visible in FIG. 2 but which is shown in FIG. 5, and which is in electrical contact with the anode 41. The central zone 29 of the collecotr 24 visible in FIG. 2 is intended to come into electrical contact with the cathode of an adjacent cell. One face of the anode 41 is in contact with the electrolyte while its other face facing the collector 24 is in contact with the fuel gas.

These anode 41 and the cathode 31 may be made of carbon or graphite together with a plastic material such as polytetrafluoroethylene for example, and each electrode includes a specific catalyst.

By way of example only, the electrodes may be of flexible structure as described in French Pat. No. 79 25 879 of Oct. 18, 1979. They may be made, in particular, by the methods described in French Pat. Nos. 79 25 877 and 79 25 878 likewise filed Oct. 18, 1979.

More details about the current collectors are given further on.

There follows a description of the various components of the electrolyte compartment as seen in the exploded perspective view of FIG. 3.

The cathode 31 is fixed to a third frame 32 having a central orifice 34 in the form of a quadrilateral and made of an insulating plastic material. Likewise, the anode 41 is fixed to a fourth frame 42 having a central orifice 40 in the form of a quadrilateral and made of a plastic material. When the third and fourth frames are fixed to each other, to the cathode and to the anode, they define therebetween an electrolyte compartment.

The frames 32 and 42 are advantageously made of the same material as the frames 22 and 25. This material may, for example, be an insulating synthetic material such as: polypropylene, polyethlene, polyvinyl chloride (PVC), acrylonitrile-butadiene-styrene (ABS), a polysulfone, or polystyrene. The thickness of the frame 32 may be in the range 0.2 mm to 5 mm and is preferably 0.5 mm to 1.5 mm. The thickness of the frame 42 may be in the range 0.1 mm to 5 mm and is preferably in the range 0.3 mm to 0.6 mm.

In the example shown, the central orifices 34 and 40 are square.

In accordance with the invention, the central orifices 34 of the third frame 32 includes a separator grating having three bars 81, 82 and 83. The thickness of these bars may not exceed the inter-electrode gap 31–41, and the bars are integrally molded (by compression or by injection) with the third frame 32. If the bar-constituting material is not hydrophilic, it is preferably rendered hydrophilic by a suitable treatment.

In an equivalent embodiment, the bars constitute a part of the fourth frame 42.

In all the above cases the bars are parallel to one another and to the direction of electrolyte flow. Such a separator gives rise to minimal head loss in the electrolyte flow and gives maximum transparency to electrolyte ions by virtue of the absence of any cross threads.

Figure 9:
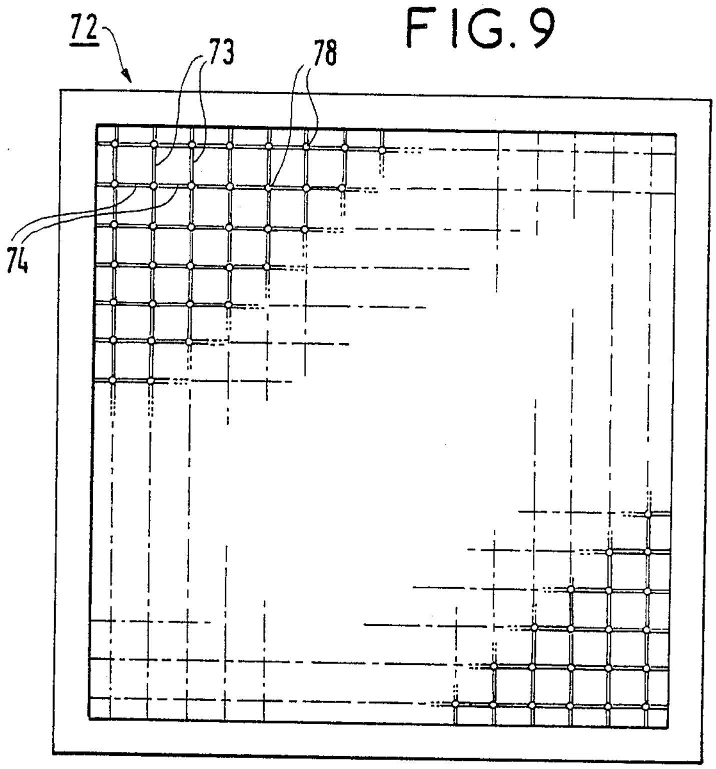
FIG. 9 is an elevation of a variant separator in accordance with the invention.
Figure 10:
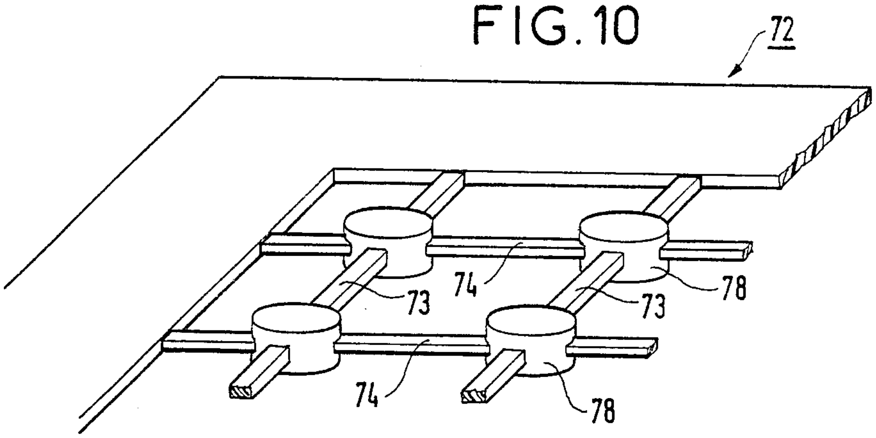
FIG. 10 is a perspective view showing a detail of the FIG. 9 separator.

FIGS. 9 and 10 show a variant embodiment of a separator in accordance with the invention and suitable for integration in the electrolyte compartment between electrodes. This separator is constituted by a grid of the same material as the above separator and is made up from longitudinal threads 73 and cross threads 74. Tabs 78 are provided at the intersections between these threads and they are constituted by small disks which are thicker than the threads 73 and 74 and which have a diameter which is greater than the pitch of the channels in the electrodes. The reference 72 corresponds to the third or fourth diagrammatically illustrated frame.

Figure 11:
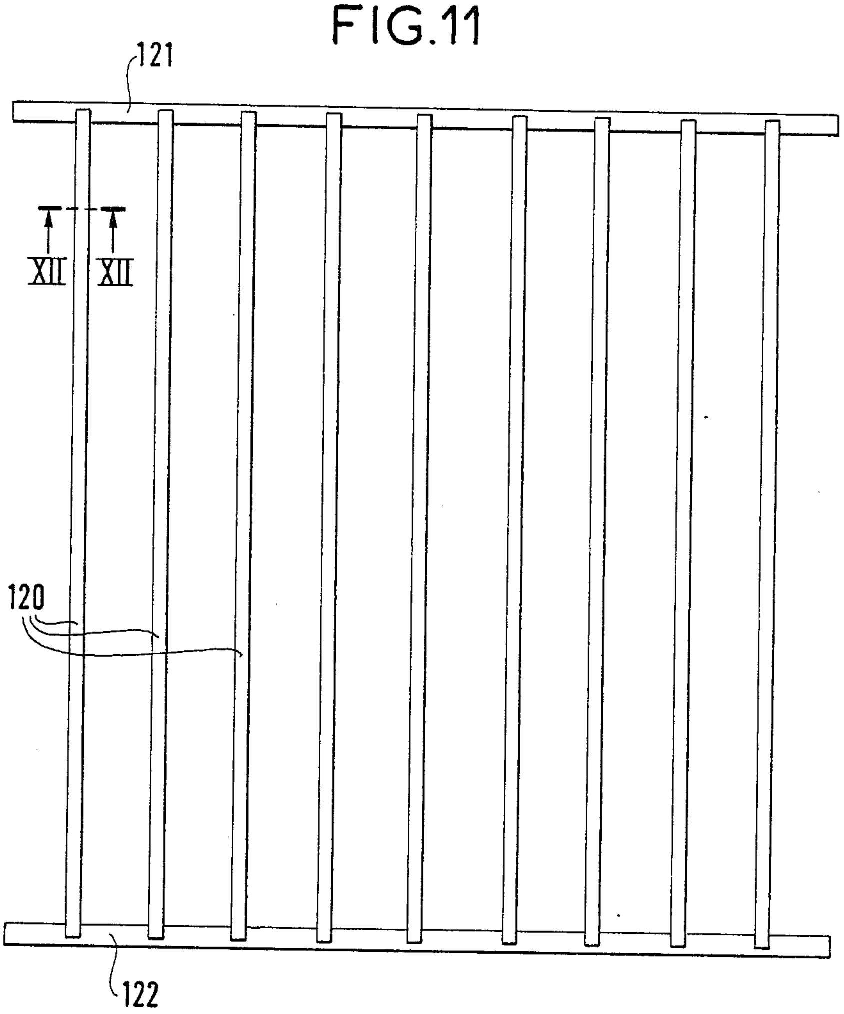
FIG. 11 is an elevation view of a variant separator in accordance with the invention.
Figure 12:
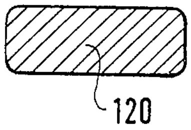
FIG. 12 is a section on a larger scale on a line XII—XII of FIG. 11.

FIGS. 11 and 12 show a separator configuration comprising about 10 bars 120 which are parallel to one another and which have their ends fixed to two thin cross-bars 121 and 122 belonging to the frames of the electrolyte compartment. As shown, more particularly in FIG. 12, the bars 120 have a generally oblong cross-section.

Figure 13:
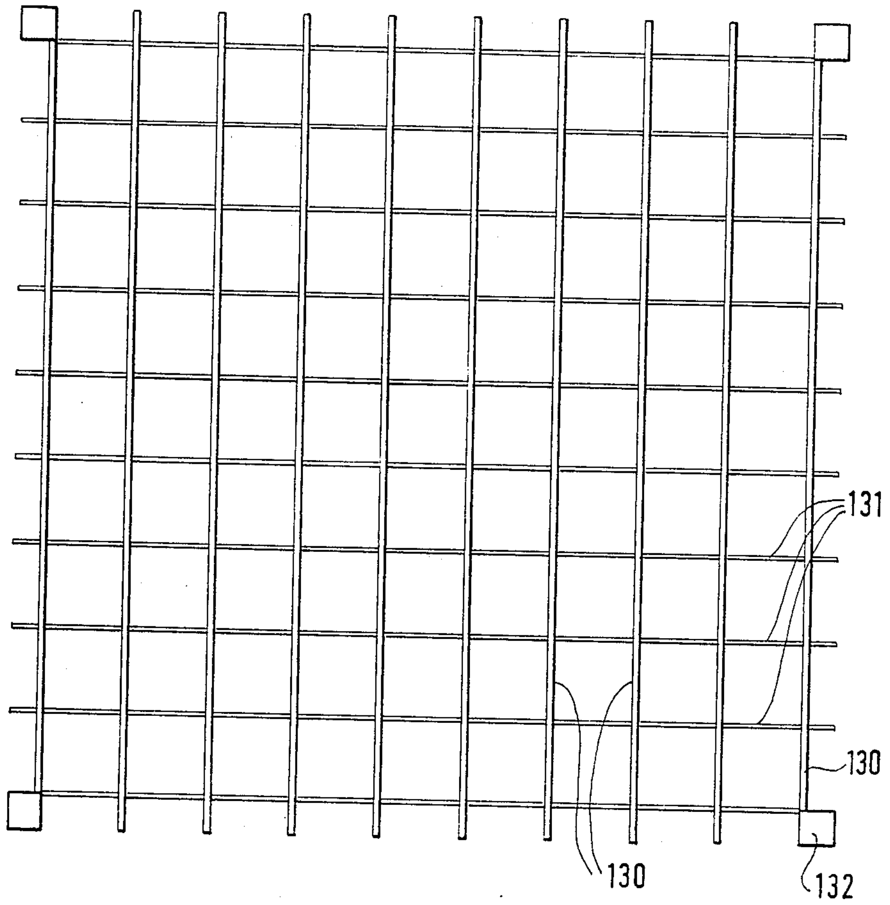
FIG. 13 is an elevation view of a variant separator in accordance with the invention.
Figure 14:
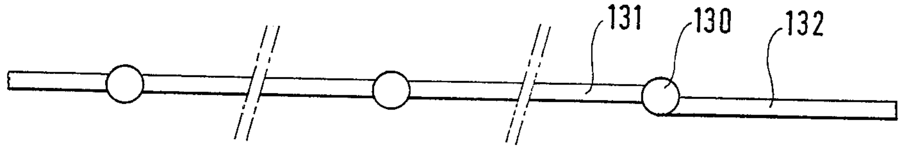
FIG. 14 is a view on a larger scale of a detail of the FIG. 13 separator.

FIGS. 13 and 14 show a separator comprising about 10 bars 130 of cylindrical section which are connected to one another by cross threads 131 made of the same material. The separator is fixed to the frames of the electrolyte compartment by means of four square and thin corner tabs 132.

The above dispositions serve to maintain a constant gap between the electrodes over the entire surface area of the element, regardless of the cause tending to close the gap: e.g. frame warping, local electrode unsticking, etc . . . , which may give rise to a gap reduction of about 1 mm.

The surface of the grating is preferably hydrophilic so as to facilitate complete filling of the compartment with electrolyte by the wick effect, which filling is made difficult by the hydrophilic or semi-hydrophilic nature of the two walls constituted by the surfaces of the two electrodes.

FIGS. 4 to 8 show additional details of the current collectors. FIG. 4 shows the cathode face 28 of the bipolar collector 21 while FIG. 5 shows the anode face 27 of the collector 24. (Since the collectors 21 and 24 are identical, it could also be said that FIGS. 4 and 5 show the cathode face and the anode face respectively of the same collector).

In FIGS. 2 and 4 which show the cathode collector 21, the electrolyte inlet orifice is referenced 88A, the electrolyte outlet orifice is referenced 88B and the orifices for facilitating component assembly are referenced 89. Likewise, in FIGS. 2 and 5, the corresponding orifices in the anode collector 24 are referenced 98A, 98B and 99. Orifices for conveying fuel are referenced 108.

The frames 22 and 25 of the collectors 21 and 24 are advantageously made from the synthetic insulating material impregnated with an inert material such as talc for modifying the mechanical and thermal characteristics of the frames. Thus, by way of example, in order to obtain a coefficient of thermal expansion which is close to the coefficient of the central conductive zones of the collectors, the frames may be made from talc-impregnated polypropylene with e.g. 5% to 90% talc, and preferably with 35% to 45% talc.

The central conductive zone of a collector is shown in section and on an enlarged scale in FIG. 6. It includes corrugations 103 defining channels 104 which extend generally vertically for guiding gas flow. The pitch and the depth of the corrugations, and thus of the channels, may be 0.2 mm to 5 mm, and is preferably 0.5 mm to 1.5 mm.

The central conductive zones of the collectors are advantageously made from the same plastic material as the frames are made from, but impregnated with a different material, e.g. powdered metal, graphite, carbon, oven black, or acetylene black, or fibers of carbon or graphite, or a mixture of such materials. By way of example, the central conductive zones may be made of carbon black impregnated polypropyline having 10% to 90% carbon black, and preferably 30% to 50%.

The frames of the collectors may be made by thermocompression or by injection molding. Injection molding is particularly advantageous for making current collectors since the materials that respectively constitute the insulating frame and the central conductive zone are injected simultaneously into the mold while they are both in a fluid state, thereby welding the two materials together and avoiding any discontinuity between the two zones. Injection molding is also cheap.

The means for supplying the fluids to the cathode and anode compartments are described below.

The face 28 of the collector 21 shown in FIG. 4 is intended to be supplied with oxidant, e.g. oxygen, while the face 27 of the collector 24 shown in FIG. 5 is supplied with fuel, e.g. hydrogen.

Figure 7:
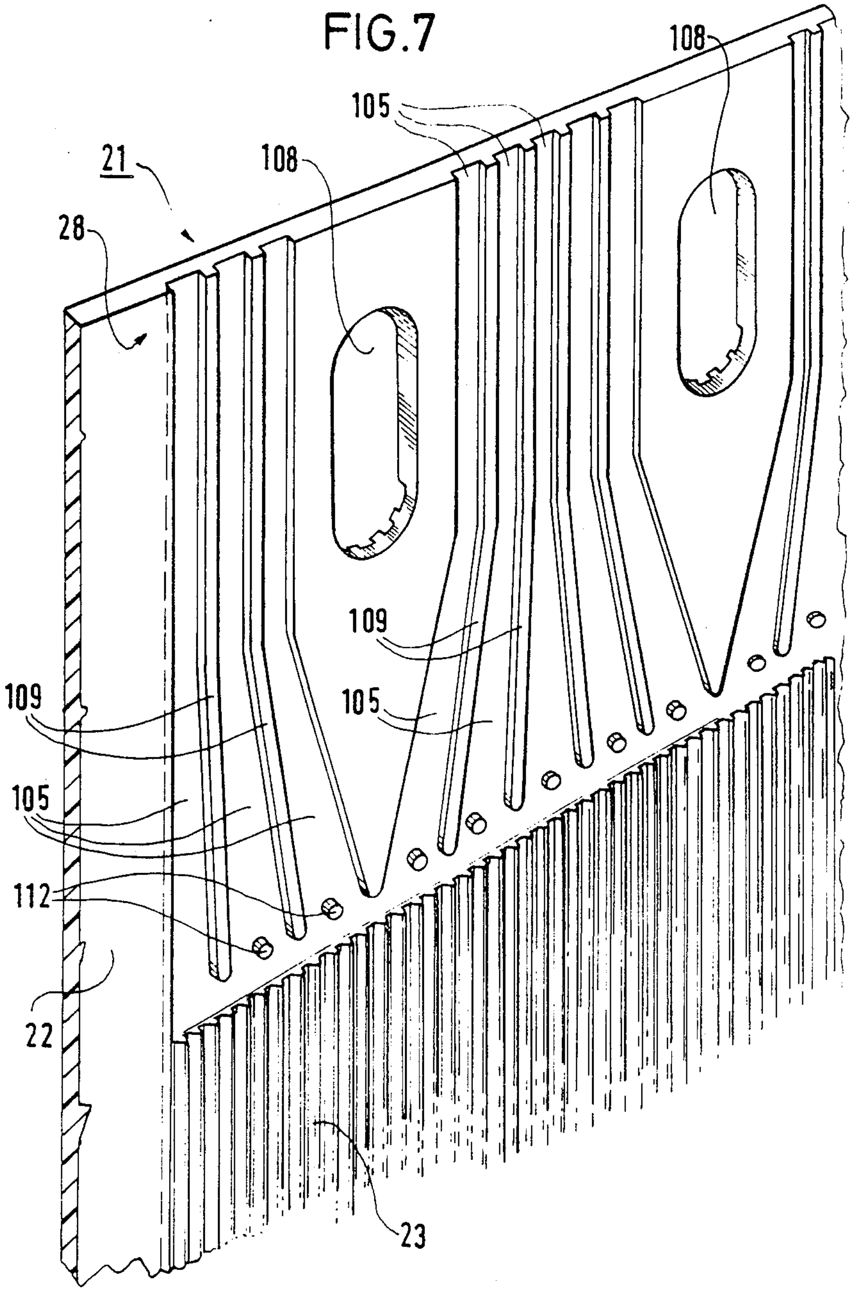
FIG. 7 is a perspective view on a larger scale of a portion or detail VII of FIG. 4.

As can be seen in FIG. 7, the top portion of the face 28 of the frame 22 of the collector 21 is fitted with grooves or set back portions 105 which are in communication with the exterior and which enable the face 28 of the collector to be supplied with oxidant. Similar grooves are provided in the bottom portion of the frame 22 for oxidant evacuation. The oxidant thus follows a substantially rectilinear path and avoids head losses associated with changes in direction, which head losses could be particularly large when using an oxidant such as atmospheric air because of the very high flow rates that are required.

Figure 8:
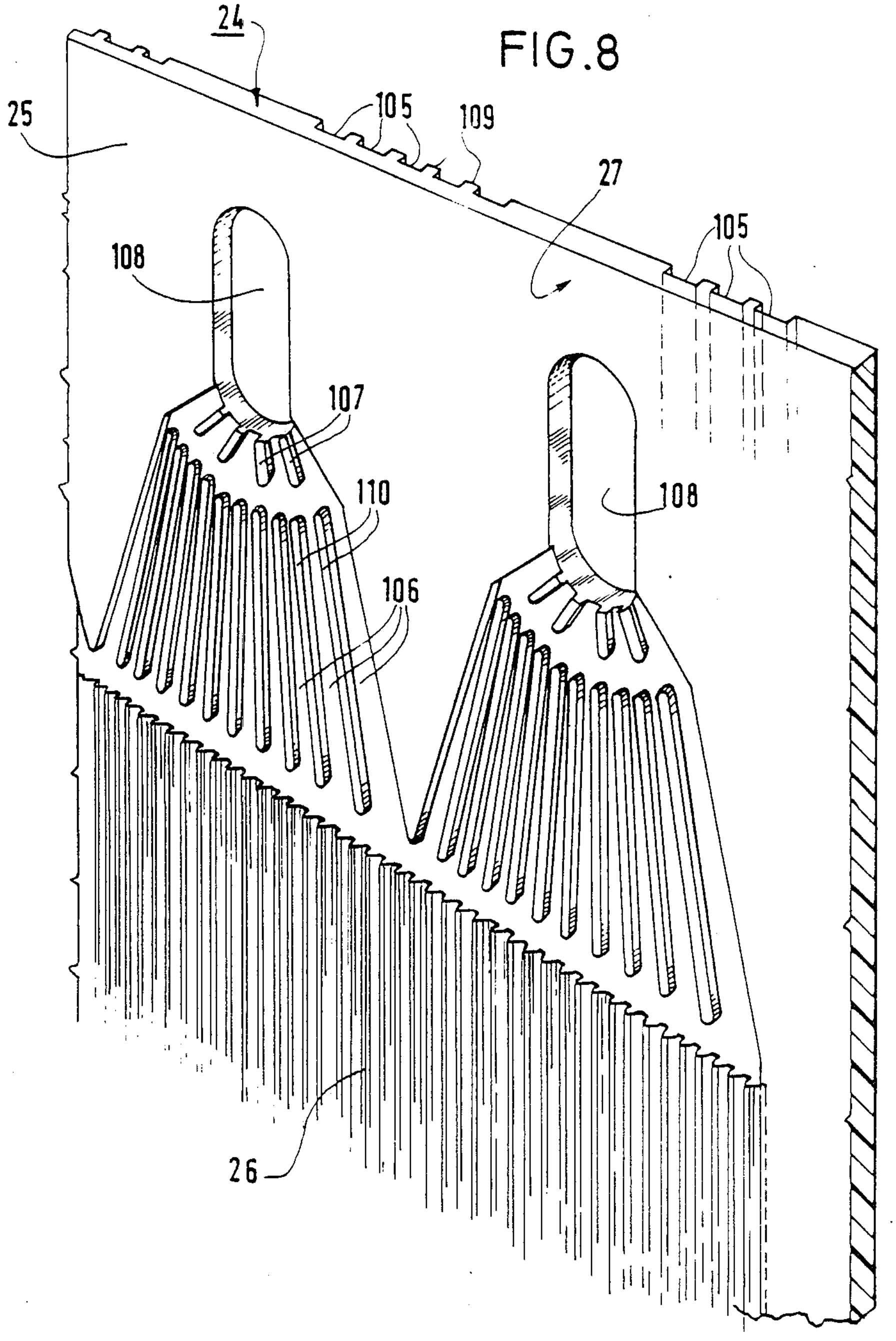
FIG. 8 is a perspective view on a larger scale of a portion or detail VIII of FIG. 4.

As can be seen in perspective in FIG. 8, the top portion of the anode face 27 of the frame 25 of the collector 24 is provided with grooves or set back portions 106 for supplying the anode face of the collector with fuel from the fuel-conveying orifices 108. Similar grooves are provided in the bottom portion of the frame 25 for evacuating the fuel.

Additional flow-distributing means are provided in the said grooves or set back portions 105 and 106. These means are constituted by elongate ribs which define distribution channels, with the top faces of the ribs being level with the face of the collector from which the grooves are set back, and thus serving to maintain a gap between the bottoms of the grooves and the adjacent component in the fuel cell assembly. The channels formed in this way are substantially vertical. It follows that since the channels delimited by the corrugations on the conductive zones of the collectors are also generally vertical as shown in the figures, the flows of fuel and of oxidant are both in substantially the same vertical direction along the faces of the collector.

As can be seen with reference to FIG. 7, the oxidant flow distributing ribs 109 are elongate and define distribution channels which are substantially vertical on the figure and which are flared towards the conductive zone 23 of the collector 21. The path followed by the oxidant over the cathode face of the collector 21 is quasi-rectilinear, and there is no significant obstacle or change of direction. In between the flared ends of the ribs 109 adjacent to the conductive zone 23 there are studs 112. Since the distribution channels open out over the entire horizontal edge of the conductive zone 23 of the collector, the oxidant is excellently distributed over the cathode face.

As can be seen with reference to FIG. 8, the fuel supply orifices 108 are oblong in shape, and the grooves or set back portions 106 for conveying the fuel are in communication with the ends of the oblong orifices that are closest to the central conductive zone 26 of the collector 24. The fuel distributing ribs define a delta network which flares away from the said orifices 108 towards the conductive zone 26 of the collector. Ribs 107 situated close to the orifices 108 define a small number of short channels which in turn lead to a larger number of longer intermediate channels defined by ribs 110 and leading to the vicinity of the channels in the conductive zones 26 of the collector. Each intermediate channel supplies fuel to at least one of the channels 104 in the conductive zone 26 of the collector 24. The use of elongate fuel distribution channels makes it possible to stack a large number of cells in a fuel cell structure while retaining low head loss in the fuel flow channels which are common to all of the cells.

Naturally, the above-described fuel cell has merely been given by way of example. Without going beyond the scope of the invention, any means described could be replaced by equivalent means. The number of bars in the separator could easily be modified, as could the shape and size of the mesh constituted by the grating.

I claim:

1. A fuel cell structure with improved separation constituted by a plurality of identical juxtaposed cells which are disposed in electrical contact with one another and which are fixed together in a predetermined cell sequence, the said cell structure including three distribution circuits which are common to all of the cells, as follows:

an electrolyte distribution circuit for distributing electrolyte from an external source and including a common inlet channel and a common outlet channel;

a fuel distribution circuit for distributing fuel from an external source and including at least one fuel inlet channel and at least one outlet channel for removing unburnt fuel and inert gases from the cell structure; and an oxidant distribution circuit including a plurality of oxidant inlet and outlet orifices situated in the bottom and top faces of the cell structure;

each cell additionally comprising:

first and second porous planar electrodes with spaced apart parallel internal faces, one being a cathode and the other an anode, and each including a specific catalyst;

an electrolyte filling the space between said electrodes; and an impermeable bipolar current collector comprising a single frame of plastic material and at least one central conductive zone within the frame having a cathode face and an anode face, with channels on each of its faces, the collector coming into electrical contact via the high points of its cathode face with the external surface of said cathode, and via its anode face with the external surface of the anode of an adjacent cell; the oxidizing gas from said oxidant distribution circuit flowing between said cathode and the cathode face of the collector and being supplied to said cathode, and the fuel gas from said fuel distribution circuit flowing between said anode and the anode face of the collector of the other adjacent cell and being supplied to said anode of the other adjacent cell; said collector frame being provided with orifices to allow the electrolyte and the fuel to flow through the cell structure, said orifices forming part of said common inlet and outlet electrolyte channels, said fuel inlet channel, and said unburnt fuel and inert gas outlet channel;

said first electrode being surrounded by a first electrode frame made of plastic material and having a central orifice in the form of a quadrilateral, the top and bottom portions of the first electrode frame including orifices for conveying fuel and electrolyte through the cell structure, said orifices corresponding to the orifices provided in the frame of the collector and likewise forming part of said inlet and outlet channels for the fuel and the electrolyte, means being provided on one face of the first electrode frame to enable electrolyte to be conveyed from the inlet channel to an electrolyte compartment situated between the two electrodes, and from said compartment to an outlet channel, said means including grooves that open out into set back portions that constitute electrolyte distributing and collecting manifolds disposed on the top and bottom portions of the first electrode frame along two opposite sides of the central orifice and in communication with the electrolyte chamber by means of a plurality of parallel microchannels delimited by ribs, the second electrode being surrounded by a second electrode frame, said second electrode frame being made of an insulating plastic material, being of identical contour to the first electrode frame surrounding the first electrode, having fuel and electrolyte conveying orifices corresponding to those provided in said first electrode frame, and having a plane face applied against the face of the first electrode frame having the grooves and the electrolyte distributing and collecting manifolds, such that each cell is an assembly of only three frames, additional sets of three frames being fixed together in a predetermined cell sequence to constitute a repetitive stack of cells and to define said fuel distribution network, said oxidant distribution network, and said electrolyte distribution network, wherein the improvement comprises:

said electrolyte compartment containing a separator constituted by a grating of insulating material forming an integral part of said first electrode frame, said grating comprising bars whose thickness is no greater than the inter-electrode spacing, the bars being parallel to each other and to the direction of electrolyte flow through the electrolyte from the common inlet channel to the common outlet channel.

2. A fuel cell according to claim 1 wherein said bars are connected to one another by cross threads of the same material.

3. A fuel cell according to claim 2, wherein said grating comprises spacing tabs at the cross-points between said bars and said cross threads.

4. A fuel cell according to claim 3 wherein said tabs are disk-shaped and have a diameter which is greater than the pitch of the channels in said electrodes.

5. A fuel cell according to any preceding claim wherein the material of said bars is selected from: polpropylene, polyvinyl chloride (PVC), nylon, polyethylene, and impregnated polymers.

6. A cell fuel according to claim 1 wherein the surface of said grating is hydrophilic.

* * * * *

UNITED STATES PATENT AND TRADEMARK OFFICE
CERTIFICATE OF CORRECTION

PATENT NO. : 4,758,481

DATED : 19 July 1988

INVENTOR(S) : Pierre FAUVEL

It is certified that error appears in the above-identified patent and that said Letters Patent is hereby corrected as shown below:

| Column | Line | Correction |
|---|---|---|
| 1 | 65-67 | Delete "for conveying fuel and electrolyte through the cell structure, said orifices corresponding to the orifices" |
| 2 | 17 | change "frme" to --frame--. |
| 2 | 30 | Change "cahnnel" to --channel--. |
| 2 | 46 | Change "trilebutadiene-styrene" to --trile-butadiene-styrene--. |
| 2 | 62 | Change "uniformn" to --uniform--. |
| 2 | 64 | Change "facilittes" to --facilitates--. |
| 3 | 9 | Change "explosiuon" to --explosion--. |
| 4 | 18 | Change "compartment" to --component--. |
| 5 | 4 | Change "polyethlene" to --polyethylene--. |
| 5 | 62 | Change "hydrophilic" to --hydrophobic--. |

UNITED STATES PATENT AND TRADEMARK OFFICE
CERTIFICATE OF CORRECTION

PATENT NO. : 4,758,481

DATED : 19 July 1988

INVENTOR(S) : Pierre FAUVEL

It is certified that error appears in the above-identified patent and that said Letters Patent is hereby corrected as shown below:

| Column | Line | Correction |
|---|---|---|
| 10 | 11 | Change "pol-" to -- poly- --. |
| 10 | 14 | Change "cell fuel" to --fuel cell--. |

Signed and Sealed this

Sixth Day of December, 1988

*Attest:*

DONALD J. QUIGG

*Attesting Officer*

*Commissioner of Patents and Trademarks*